United States Patent [19]

Vogel

[11] Patent Number: 4,799,956
[45] Date of Patent: * Jan. 24, 1989

[54] INTERCALATD GRAPHITE GASKETS AND PRESSURE SEALS

[75] Inventor: Ferdinand L. Vogel, Whitehouse Station, N.J.

[73] Assignee: Intercal Company, Port Huron, Mich.

[*] Notice: The portion of the term of this patent subsequent to Jul. 31, 2001 has been disclaimed.

[21] Appl. No.: 15,179

[22] Filed: Feb. 17, 1987

Related U.S. Application Data

[63] Continuation of Ser. No. 770,153, Aug. 27, 1985, abandoned.

[51] Int. Cl.$^4$ ............................................. C22C 29/00
[52] U.S. Cl. ....................................... 75/243; 75/230; 252/502; 252/503; 252/506; 252/509; 419/11; 419/48; 419/49; 419/68
[58] Field of Search ................ 252/502, 503, 506–509; 419/11, 48, 49, 68; 75/243, 230; 501/99, 103

[56] References Cited

U.S. PATENT DOCUMENTS

| | | | |
|---|---|---|---|
| 4,565,649 | 1/1986 | Vogel | 252/506 |
| 4,604,276 | 8/1986 | Oblas et al. | 252/506 |
| 4,642,201 | 2/1987 | Vogel | 252/506 |
| 4,645,620 | 2/1987 | Palchan et al. | 252/506 |

Primary Examiner—Stephen J. Lechert, Jr.
Attorney, Agent, or Firm—Kenyon & Kenyon

[57] ABSTRACT

A gasket or other sealing member containing intercalated graphite exhibits improved strength and safety properties and simplified manufacture. Such a gasket may be formed by filling a mold of the appropriate shape with intercalated graphite powder and applying sufficient pressure and heat to produce a coherent mass. The properties of an intercalated graphite gasket may be further improved by incorporating metal reinforcement, metal powders, organic polymers ceramic powders or even exfoliated graphite into the intercalated graphite gasket.

26 Claims, No Drawings

INTERCALATD GRAPHITE GASKETS AND PRESSURE SEALS

This is a continuation of application Ser. No. 770,153, filed Aug. 27, 1985, now abandoned.

This invention relates to sealing members such as gaskets and pressure seals formed from intercalated graphite, and a method of making same.

BACKGROUND OF THE INVENTION

Customarily, gaskets have been fabricated from asbestos or asbestos composite sheets, owing to the strength asbestos imparts to a composite material, to its relative low cost, good high temperature characteristics, and adaptability in the manufacturing process. It is now believed, however, that exposure to asbestos may be unhealthy, and that the use of asbestos should be carefully controlled and even prohibited in certain circumstances. Therefore, substitutes for asbestos useful in the manufacture of sealing members would be of interest.

A material found to have suitable properties for use in the manufacture of sealing members is graphite felt, a sheet material. Graphite felt is prepared from natural or synthetic graphite by a process which utilizes the crystalline layer structure of graphite, see e.g., Shane, et al., U.S. Pat. No. 3,404,061, "Flexible Graphite Material of Expanded Particles Compressed Together," and Yamazoe, et al., U.S. Pat. No. 4,234,638, "Composite Graphite Sheets." The carbon atoms in each layer are bonded in a hexagonal array but between the layers there are only weak van der Waals forces. It has been found that due to this weak interlayer force, the distance between the graphite layers may be opened up or expanded. This is accomplished by treating graphite powder with an expanding agent having strong oxidizing properties, such as nitric acid, sulfuric acid, mixtures of nitric and sulfuric acid, perhaloacids such as $HClO_4$ and the like, followed by rapid heating. Under these conditions, the graphite particles expand or exfoliate in an accordion fashion to as much as one hundred times their original volume. The fluffy, exfoliated powder thus formed is pressed between platens or rollers to form a sheet having the general characteristics of a felt, web, paper, strip, foil or the like.

In the making of gaskets, this graphite felt may be substituted for asbestos composite sheets by die cutting to the appropriate shape. However, since pressed exfoliated graphite is generally weak and brittle, the edges of a sealing member formed therefrom must be laminated and reinforced with metal. Further, the sheet method generates a certain amount of waste as portions of graphite felt must be excised for every sealing member formed. Although this waste can be avoided by pressing the exfoliated powder in a die of the desired shape, the extreme reduction of volume—about one hundred fold—required to go from powder-loaded die to final gasket thickness presents equipment problems.

Moreover, in typical applications, compression molded exfoliated graphite will function adequately at temperatures up to about 200° C. However, it will be destroyed by oxidation above 450° C. when used in air and at about 600° C. when used in a sealed environment.

Consequently, it would be desirable to develope a sealing member which is easy and economical to manufacture and is sufficiently strong to be used with reduced or with no metal reinforcing.

It is therefore an object of this invention to provide a sealing member made from graphite which has improved properties.

It is another object of this invention to provide a sealing member that is useful in dry atmospheres and in a vacuum.

It is another object of this invention to provide a sealing member containing graphite which is stable in air and over a range of temperatures.

It is another object of this invention to provide a sealing member containing graphite which has superior sealing performance due to higher strength and greater edge holding properties.

It is still another object of the present invention to provide a composite sealing member of intercalated graphite and a metal powder, a ceramic powder and/or a polymer.

It is still another object of this invention to provide a more efficient method of manufacture for graphite sealing members requiring simplified dies for pressing.

It is a still further object of this invention to provide a graphite sealing member requiring reduced amounts of metal reinforcement.

SUMMARY OF THE INVENTION

According to the invention, these and other objects are achieved by a sealing member made from intercalated graphite. The intercalating species may be any suitable species which produces an intercalated graphite which is stable in air at high temperatures such as a temperature up to 600° C. In general, these species include but are not limited to metal halides of transition elements, halides of Group III A, IV A, V A and VI A metals or metalloids, as well as, the corresponding metals and metalloids themselves. In addition, halogens such as $F_2$ and $Br_2$ and interhalogens such as IBr may be useful as intercalating species as well.

The graphite that is to be intercalated may be any natural or synthetic graphite and may be employed in a powdered, flaked, fiber, exfoliated or a similar form.

The intercalated graphite may be compressed uniaxially (such as in a die or mold) or isostatically (such as in a pressurized fluid) to form a compacted body of the desired shape. Alternatively, the intercalacted graphite may be compressed into a blank and subsequently milled into the desired slope.

Metal reinforcement may be included in the sealing member, either as a layer in a multi-layer structure; as a metal edge reinforcement; or as part of a composite material comprising intercalated graphite powder and metal powder.

In another embodiment of the invention the intercalated graphite may be mixed with a thermoplastic or thermosetting polymer or a ceramic powder to achieve the desired properties.

The intercalated graphite may also be mixed with exfoliated graphite in proportions suitable to obtain the maximum advantage of the properties of both materials. This advantage may also be obtained by combining exfoliated and intercalated graphite in a single particle form.

The sealing members, including gaskets and pressure seals made according to the invention, are particularly suited for use as automobile engine head gaskets and petroleum pipeline gaskets, as well as, in vacuum and/or dry air applications.

DETAILED DESCRIPTION OF THE INVENTION

The superior strength of the gasket or pressure seal of the invention is a function of the fact that intercalated graphite is a material displaying metal-like properites. One of these metallic properties is ductility, or permanent deformation under an applied sheer stress. When pressure is applied to ordinary graphite particles in a simple die, they compact. After release from the die, however, the compacted body is extremely friable and weak, sometimes falling apart due to its own weight. This behavior is typical of any substance which is completely brittle, or without ductility. In contrast, intercalated graphite powder, like any ductile metal powder, can be compacted in a die or mold into a body which is found to have coherence and strength proportional to the magnitude of the applied pressure and temperature.

The intercalated graphites suitable for use in the invention are those which are stable in air and at elevated temperatures such as a temperature of 600° C. or higher. The most stable intercalated compounds having these properties are those intercalated with certain metal halides or metals, the main requirement being that the intercalating species is capable of exchanging charge with the host graphite.

The metal halides most suitably used in the present invention are halides of transition elements, halides of Group III A, IV A, V A and VI A metals or metalloids. The preferred Group III A metals and metalloids include Boron, Aluminum, Gallium, and Indium.

Graphites intercalated with the halides are formed in general by heating a mixture of graphite and the intercalating species to between 200° C. and 900° C. in the presense of chlorine gas for several hours. It is believed that the chlorine attacks the carbon atoms in the graphite lattice, thus forming positively charged sites throughout the graphite. The chlorine also reacts with the intercalating species to produce a negatively charged species which is attracted to and held by the positively charged carbon atoms thereby intercalating the graphite. This explanation of the mechanism of intercalation, however, is not meant to be definitive or a limitation of the invention.

The metal intercalated graphites may be produced by preparing a metal halide intercalated graphite by the process described above and then reducing, in the presence of a reducing agent, the metal halide to a metal in situ thus producing a graphite containing a metal in its lattice structure. Suitable reducing agents include hydrogen gas, lithium biphenyl and certain hydrides (e.g., $LiAlH_4$, $NaBH_4$, $NaH$, $CAH_2$). The reduction typically takes place at between 100° C. to about 300° C. It is believed that all the metal halides, described above, may be used to produce metal intercalated graphites that are equally as stable.

Of the foreging species, the metal halides are preferred and of these halides, copper chloride, nickel chloride and chromium chloride are the most preferred. If, however, a metal intercalated graphite is desired the graphite preferrably contains copper, nickel or silver which has been reduced in situ from the corresponding halide.

The graphite employed in the present invention may be any of the known graphites and may be used in powder, flaked or exfoliated form. In fact, it is believed that using exfoliated graphite facilitates the introduction of the intercalating species into the graphite lattice.

The sealing members of the invention may be fabricated using a variety of parameters and constituents, depending upon the ultimate use to which the gasket will be put.

Where the sealing member to be fabricated, such as a gasket, does not require any metallic reinforcement, the intercalated graphite powder is placed in a mold of the desired shape and pressed. Pressures may range from that which barely produces a coherent mass, i.e., about 1000 pounds per square inch (psi), to as high as is practically possible. For example, a forming pressure of 15,000 psi produces a strong, useful member. The temperature applied during compression may range from room temperature (about 20° C.) to about 1000° C. or higher, with the higher temperature being preferred. High temperatures and pressures produce higher strength and higher density bodies. Pressing times for these members range from about 1 to about 30 minutes.

The materials used for the mold or die are important because intercalated graphite at elevated temperatures and pressures will adhere to most metals, such as steel, which are commonly used for this purpose. Therefore, it is desirable either to fabricate the die parts from solid polytetrafluoroethylene or similar non-stick material, or to coat the metal of the die or mold with sprayed-on fluorpolymite telomer powder. A suitable commercial spray is GP 1589 manufactured by Acheson Colloids Co., Inc., Port Huron, Mich. Coatings of fine oxide powders, such as $Al_2O_3$, or thin aluminum foil may also be helpful as parting materials.

The sealing members of the invention may also be fabricated through the use of isostatic pressing. The intercalated graphite material is placed in a bag-like container, the container is evacuated and is then submerged in a pressurized medium. Unlike typical mold or die pressed which apply pressure in only one direction, isostatic pressure applies an essentially uniform pressure around the entire pressed object. In addition, isostatic pressing generates much higher pressures than the molds or dies and, therefore, produces support members exhibiting higher density and strength.

The bag-like container used in isostatic pressing is typically a shape-retaining rubber-like housing that will transfer pressure evenly around its perimeter. The housing will be shaped to conform with the desired final shape of the intercalated grahite support member. The pressurized medium may be any suitable fluid such as ethylene glycol, hydraulic oil and the like.

Due to the large volume changes experienced when fabricating intercalated graphite members (especially when exfoliated graphite is one of the starting materials), some uniaxial pre-pressing of the intercalated graphite using conventional means is typically done before isostatic pressing is performed.

Where it is necessary or desirable, because of the application, metal reinforcement may be incorporated into the sealing member. In one preferred embodiment, the metal is used as a laminate and takes the same general shape as a part of or as the entire sealing member. The intercalated graphite is spread evenly in the mold or die as the first layer. The metal reinforcement is then put in place and is, followed by another layer of intercalated graphite placed over the reinforcement. This three layer structure is compressed for example at a pressure of 15,000 psi and a temperature of 200° C. These conditions are sufficient to produce a coherent body.

In another preferred embodiment, where the application requires that the sealing member have a metal edge reinforcement, the mold must be shaped to receive and hold in position the metal reinforcement. After the metal reinforcement is put in its place in the mold, the intercalated graphite is introduced in the mold cavity, and the whole is pressed and heated, as set forth above, to produce a coherent body.

In a third preferred embodiment, the desired properties may be obtained by pressing in a mold, as set forth above, a mixture of intercalated graphite and metal powders. In such applications, any metal powder may be used, such as copper, iron, nickel or cobalt, in proportions ranging from about 2 percent to about 90 percent by weight of the composite material. Preparation of a composite sealing member of this type is possible because, unlike non-intercalated graphite, intercalated graphite bonds to metals under pressure. Therefore, a mixture of intercalated graphite powder and metal powder will, under pressure, form a coherent mass in which the two constituents are mutually reinforcing.

Sealing members suitable for other applications may be obtained by mixing a thermoplastic or thermosetting polymer with intercalated graphite in proportions ranging from about 5 percent to about 85 percent by weight of the polymer in the resulting mixture. At the lower end of this range, hard, high strength, somewhat brittle composites are formed. At higher polymer concentrations, softer, more pliable composites are obtained. Preferred polymers for this use include epoxy resins, thermoplastic resins, aromatic resins, polyesters, aldehyde resins, aromatic resins, polyesters, polyamides, polyolefins of high and low molecular weight and varying degrees of cross-linking, polycarbonates, polyfluorinated olefins, polyurethanes, polyethers and the like.

When a thermosetting polymer is used, the intercalated graphite would typically be mixed with a thermosetting liquid resin, and formed into the desired shape. The mixture is then cured using techniques well-known to persons skilled in the art. When a thermoplastic polymer is employed, the polymer (which is typically a powder) is mixed with the intercalated graphite and the mixture is formed into the desired shape using temperature and pressure in much the same way as the intercalated graphite by itself would be formed into the desired shape.

In still another embodiment intercalated graphite may be mixed with ceramic powders to form a useful graphite. These composites preferable contain, from about 5 percent to about 85 percent by weight of the ceramic powder and are formed in much the same manner as the metal/intercalated graphite composites. The preferred ceramic powders include silicon nitride, boron carbide, silicon carbide, partially stabilized zirconia, titanium oxides and the mixtures thereof.

Although the huge volume change encountered in pressing exfoliated graphite into a gasket is a major disadvantage of that material compared to intercalated graphite, exfoliated graphite has better resilience propertires than pure intercalated graphite. Advantage may be taken of the desirable propertires of both these materials, however, by using them in combination. In one preferred embodiment, a mixture of exfoliated graphite and intercalated graphite particles are pressed in a die to form a compact. The intercalated graphite provides bonding strength to the compacted form, while the exfoliated graphite reduces the overall density and confers resilience on the composite.

In another preferred embodiment, the combination of the resilience of the exfoliated graphite and the coherence of the intercalated graphite is obtained in a single particle form. This is achieved by utilizing the fact that several macrocrystalline intercalation structures are possible. For example, the crystal lattice may be repeating units composed of the sequence : carbon plane, intercalation species; or the sequence : carbon plane, carbon plane, intercalation species; or the sequence carbon plane, carbon plane, carbon plane, intercalation species; and so forth. Such repeating units are termed stages and, as exemplified above, are respectively stage 1, stage 2 and stage 3. Other stages correspond to other similar sequences.

The graphite particles of this embodiment are prepared by first exfoliating graphite so that only part of the particle is expanded. Methods for this partial exfoliation are known in the art. The unexpanded part of the partially exfoliated particle is then intercalated. The result is a complex material consisting of particles that are partly exfoliated and partly intercalated. A compact composed of such particles would have the combined properties of the intercalated graphite and the exfoliated graphite.

A problem which is sometimes encountered in members or structures from metal halide intercalated graphite is that of environmental stability when the intercalated graphite members are stored or used under extremely high humidity. This stability problem takes the form of cracking, swelling and corrosion of the intercalated graphite member which appears after 1 to 6 months of storage or use. It is unclear what causes this lack of environmental stability, however, it does appear to be a function of intercalated graphite member forming pressures and temperatures (i.e., the higher the forming pressure and temperature, the more likely it is that this instability will appear) and possibly the type of graphite chosen as the starting material.

The present invention is not affected by this problem when low forming pressures and temperatures such as 10,000 psi and 100° C. are used and when the use of intercalated graphite members and structures is limited to normal humidity applications. However, the problem may also be solved by a composition prepared by mixing the intercalated graphite powder with small amounts of transition metals, such as nickel, copper, silver, tungsten, or molybdenum, prior to forming of an intercalated graphite member. Structural members of this composition which may contain from about 2 vol. % to about 30 vol. % metal powder experience none of the environmental stability problems described above even though a high forming pressure and temperature is used and high humidity is present. After the metal powder has been mixed with the intercalated graphite, this mixture may be handled in the same way as the intercalated graphite as described above.

From the foregoing, it is evident that the present invention provides a novel sealing member, capable of being formed economically into the desired shape in simple dies or molds and having improved strength.

The invention will be further illustrated by the following examples, but the invention is not intended to be limited thereto.

EXAMPLE 1

Graphite Intercalated with Copper Chloride

Graphite intercalated with copper chloride was prepared by mixing a quantity of graphite powder with a quantity of $CuCl_2$ to produce mixture containing 48 wt % CuCl$_2$. This mixture was loaded into a glass reaction vessel and heated to 125° C. for 25 hours with dry N$_2$ forming therethrough to remove any water present. The temperature of the reaction vessel was then raised to 500° C., the dry N$_2$ gas flow stopped and a flow of dry chlorine at a gauge pressure of 3 to 6 inches of water was begun. The resulting reaction was continued for 4 hours. This treatment produced free flowing, black powder having a bulk density of from 0.18 to 0.34 gm/cm$^3$ (depending on the particle size). The intercalated graphite crystals themselves are stage III and have a specific gravity of about 2.6 gm/cm$^3$.

EXAMPLE 2

Forming of a Gasket from Intercalated Graphite

A gasket having a surface area of about one square inch was formed in a steel mold as follows:

An aluminum foil parting layer cut to the same size and shape as the gasket was placed on the bottom of the mold. A sufficient amount of intercalated graphite produced according to the steps outlined in Example 1 was then added to the mold. Finally, a second piece of aluminum foil was carefully placed in position on top of the powder and a pressure ram was placed into the mold. A force of 10,000 pounds are applied to the powder by the piston at room temperature for a period of 30 minutes. After the pressure was relieved the resulting gasket member was removed from the mold and the aluminum parting foils peeled off. The resulting sample had a scheroscope hardness of 12.

EXAMPLE 3

Seal made with metal stabilized intercalated graphite.

Intercalated graphite produced as outlined in Example 1 in the amount of 2.58 grams was mixed with 1.8 grams of copper powder and formed into the desired shape by pressing at 100,000 pounds per square inch in a metal die coated with PTFE (polytetrafluoroethylene) at a temperature of 100° C. The resulting member exhibited no environmental stability problems and had a scheroscope hardness of 35.

EXAMPLE 4

Copper Reinforced Intercalated Graphite Gasket

A teflon mold was shaped to receive and hold in position a reinforcement of copper metal. After the copper reinforcement of thickness of 0.005 inches was inserted, intercalated graphite was introduced in sufficient amount into the mold cavity and the whole was pressed at 10,000 psi and a temperature of 80° C. for 10 minutes to produce a coherent body.

EXAMPLE 5

A mixture of 80 weight percent polyamideimide powder (trade name Torlon) and 18 weight percent nickel chloride intercalated graphite with 2 weight percent nickel powder was thoroughly mixed and pressed for 30 minutes at 300° C. and 2,500 psi. The resulting compact had a Rockwell T hardness of 70.

What is claimed is:

1. A sealing member comprising a compacted body formed from an intercalated graphite powder which is stable in air and at elevated temperature, said body being essentially free of separately added copper, nickel, silver, molybdenum or tungsten metal powder.

2. A sealing member in accordance with claim 1 wherein the sealing mbmer is a gasket.

3. A sealing member in accordance with claim 1 wherein the sealing member is a pressure seal.

4. A sealing member in accordance with claim 1 wherein said intercalated graphite is intercalated with an intercalation species selected from the group consisting of a metal halide and a metal, wherein the metal halide is selected from the group consisting of a halide of a transition element, a halide of a Group III A, IV A, V A and VI A metal or metalloid, and the metal is selected from the group consisting of a transition element, Group III A, IV A, V A and VI A metal or metalloid.

5. A sealing member in accordance with claim 4 wherein the intercalation species is the metal halide.

6. A sealing member in accordance with claim 5 wherein the metal halide, prior to forming said member, is reduced in situ to a metal in the presence of a reducing agent to form a metal intercalated compound.

7. A sealing member in accordance with claim 5 wherein the intercalation species is selected from the group copper chloride, nickel chloride, and chromium chloride.

8. A sealing member in accordance with claim 1 further comprising a metal reinforcement incorporated into the member.

9. A sealing member in accordance with claim 8 wherein the metal reinforement is interposed between layers of the intercalated graphite.

10. A sealing member in accordance with claim 8 wherein the metal reinforcement is disposed on an edge of the sealing member.

11. A sealing member in accordance with claim 1 further comprising a metal powder other than copper, nickel, silver, molybdenum or tungsten admixed with the intercalated graphite.

12. A sealing member in accordance with claim 11 wherein the metal powder is selected from the group comprised of nickel, iron, nickel and cobalt.

13. A sealing member in accordance with claim 11 wherein the metal powder comprises from about 2 percent to about 90 percent by weight of the member.

14. A sealing member in accordance with claim 1 further comprising a thermoplastic polymer admixed with the intercalated graphite.

15. A sealing member in accordance with claim 14 wherein the thermoplastic polymer comprises from about 5 percent to about 85 percent by weight of the sealing member.

16. A sealing member in accordance with claim 1 further comprising a thermosetting polymer admixed with the intercalated graphite.

17. A sealing member in accordance with claim 16 wherein the thermosetting polymer comprises from about 5 percent to about 85 percent by weight of the sealing member.

18. A sealing member in accordance with claim 1 further comprising a ceramic powder admixed with the intercalacted graphite.

19. A sealing member in accordance with claim 18 wherein the ceramic powder comprises about 5 percent to about 85 percent by weight of the sealing member and wherein the ceramic powder is selected from the group comprised of silicon nitride, boron carbide, silicon carbide, partially stabilized zirconia, titanium dioxide and mixtures thereof.

20. A sealing member in accordance with claim 1 further comprising exfoliated graphite.

21. A sealing member in accordance with claim 20 formed by partially exfoliating graphite particles and intercalating the partially exfoliated graphite particles.

22. A sealing member comprising a compacted body formed from particles of a graphite material wherein the particles are partly exfoliated and partly intercalated.

23. A sealing member in accordance with claim 22 wherein said particles are intercalated with copper chloride.

24. A sealing member formed by compacting intercalated graphite particles at a pressure of greater than 1000 pounds per square inch and a temperature of from about 20° C. to about 1000° C.

25. A sealing member in accordance with claim 24 wherein the pressure is applied isostatically.

26. A sealing member in accordance with claim 24 wherein said pressure is applied uniaxially.

* * * * *